(12) United States Patent
Yamazaki

(10) Patent No.: US 10,881,576 B2
(45) Date of Patent: Jan. 5, 2021

(54) WALKING ASSISTANT HARNESS

(71) Applicant: TOYOTA JIDOSHA KABUSHIKI KAISHA, Toyota (JP)

(72) Inventor: Seisuke Yamazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/873,014

(22) Filed: Jan. 17, 2018

(65) Prior Publication Data

US 2018/0200136 A1 Jul. 19, 2018

(30) Foreign Application Priority Data

Jan. 19, 2017 (JP) .................................. 2017-007888

(51) Int. Cl.
*A61H 3/00* (2006.01)
*A61F 5/00* (2006.01)
(Continued)

(52) U.S. Cl.
CPC ............. *A61H 3/008* (2013.01); *A61H 1/024* (2013.01); *A61H 1/0262* (2013.01); *A61H 3/00* (2013.01);
(Continued)

(58) Field of Classification Search
CPC ............. A61B 2503/10; A61B 2505/09; A61B 5/1116; A61B 5/112; A61B 5/1123; A61B 2562/0247; A61B 5/0024; A61B 5/4528; A61B 5/0816; A61B 5/1038; A61B 5/1121; A61B 5/1122; A61B 5/4585; A61B 5/6807; A61B 5/6823; A61B 2017/06176; A61B 5/6811; A61B 5/6812; A61B 5/6828; A61B 5/6829; A61H 3/008; A61H 1/0262; A61H 2201/165; A61H 3/00; A61H 1/024; A61H 2201/164; A61H 2201/5061; A61H 2201/1215; A61H 2201/1652; A61H 2003/007; A61H 2201/0192; A61H 1/0244; A61H 2201/5069; A61H 1/0266; A61H 2201/1642; A61H 2201/1676;
(Continued)

(56) References Cited

U.S. PATENT DOCUMENTS 5,782,785 A 7/1998 Herzberg
6,821,233 B1 11/2004 Colombo et al.
(Continued)

FOREIGN PATENT DOCUMENTS

CN 105287169 A 2/2016
EP 0 677 282 A2 10/1995
(Continued)

*Primary Examiner* — Ann Schillinger
(74) *Attorney, Agent, or Firm* — Oblon, McClelland, Maier & Neustadt, L.L.P.

(57) ABSTRACT

A walking assistant harness attached to a leg of a trainee so as to assist walking of the trainee includes: a thigh frame placed along a front side or a rear side of a thigh of the trainee; and a thigh fixation belt connected to the thigh frame at a connection portion, so as to fix the thigh of the trainee to the thigh frame, and the connection portion includes a connecting position adjustment mechanism configured to adjust a connecting position with the thigh fixation belt in a right-left direction of the trainee.

4 Claims, 17 Drawing Sheets

(51) Int. Cl.
    *A61H 1/02*     (2006.01)
    *B25J 9/00*     (2006.01)

(52) U.S. Cl.
    CPC ......... *A61H 2003/007* (2013.01); *A61H 2201/0192* (2013.01); *A61H 2201/164* (2013.01); *A61H 2201/165* (2013.01); *A61H 2201/1642* (2013.01); *A61H 2201/1652* (2013.01); *A61H 2201/5061* (2013.01); *A61H 2205/10* (2013.01); *B25J 9/0006* (2013.01)

(58) Field of Classification Search
    CPC ........ A61H 2201/1261; A61H 2205/10; A61H 2001/0211; A61H 2201/1628
    See application file for complete search history.

(56) References Cited

U.S. PATENT DOCUMENTS

| | | | |
|---|---|---|---|
| 8,057,410 B2 * | 11/2011 | Angold | ............ A61H 3/00 601/35 |
| 8,372,023 B2 | 2/2013 | Garth et al. | |
| 8,517,964 B2 * | 8/2013 | Sreeramagiri | ........ A61F 5/0123 602/16 |
| 2009/0240181 A1 | 9/2009 | Sreeramagiri et al. | |
| 2010/0036302 A1 | 2/2010 | Shimada et al. | |
| 2014/0005798 A1 | 1/2014 | Bache et al. | |
| 2015/0230945 A1 | 8/2015 | Bache et al. | |
| 2015/0342820 A1 | 12/2015 | Shimada et al. | |
| 2017/0340507 A1 | 11/2017 | Shimada et al. | |
| 2018/0161230 A1 * | 6/2018 | Maekita | ............ A61B 5/4836 |

FOREIGN PATENT DOCUMENTS

| | | |
|---|---|---|
| EP | 2 949 365 A1 | 12/2015 |
| JP | 2010-35899 A | 2/2010 |
| JP | 2011-110155 A | 6/2011 |
| JP | 2016-152867 | 8/2016 |
| WO | WO 2015/018340 A1 | 2/2015 |

\* cited by examiner

WALKING ASSISTANT HARNESS

INCORPORATION BY REFERENCE

The disclosure of Japanese Patent Application No. 2017-007888 filed on Jan. 19, 2017 including the specification, drawings and abstract is incorporated herein by reference in its entirety.

BACKGROUND

1. Technical Field

The present disclosure relates to a walking assistant harness.

2. Description of Related Art

There has been known a walk training apparatus which includes a walking assistant harness attached to a leg of a trainee, and a training device for performing walking training of the trainee, and which performs walking training of the trainee such as a patient with hemiparesis after stroke. Japanese Patent Application Publication No. 2016-152867 (JP 2016-152867 A) describes a walking assistant harness including a thigh frame placed along a front side of a thigh of a trainee, and a thigh fixation belt provided in the thigh frame so as to fix the thigh of the trainee to the thigh frame.

SUMMARY

In the walking assistant harness described in JP 2016-152867 A, the thigh fixation belt is fixed at a predetermined position in the thigh frame. That is, a position in the thigh frame at which the thigh fixation belt is connected is always the same. Generally, the position in the thigh frame at which the thigh fixation belt is connected is a center of a width of the thigh frame when viewed from a front-rear direction of the trainee. However, in a case where the thigh fixation belt is fixed at the predetermined position in the thigh frame, when a trainee with a small build wears the walking assistant harness, for example, a leg of the trainee, opposite to a leg wearing the walking assistant harness, might interfere with the thigh frame.

The present disclosure provides a walking assistant harness that can restrain a thigh frame from interfering with a leg of a trainee, opposite to a leg wearing the walking assistant harness, regardless of a build of the trainee.

A first aspect of the present disclosure relates to a walking assistant harness attached to a leg of a trainee so as to assist walking of the trainee, and the walking assistant harness includes: a thigh frame placed along a front side or a rear side of a thigh of the trainee; and a thigh fixation belt connected to the thigh frame at a connection portion so as to fix the thigh of the trainee to the thigh frame, wherein the connection portion includes a connecting position adjustment mechanism configured to adjust a connecting position with the thigh fixation belt in a right-left direction of the trainee.

The connection portion that connects the thigh fixation belt to the thigh frame includes the connecting position adjustment mechanism configured to adjust the connecting position with the thigh fixation belt in the right-left direction of the trainee. On this account, in a case where the walking assistant harness is attached to a trainee with a small build, the connecting position of the thigh frame with the thigh fixation belt can be moved toward an opposite leg of the trainee to a leg wearing the walking assistant harness as compared to a case where the walking assistant harness is attached to a trainee with a large build. This makes it possible to restrain the thigh frame from interfering with the leg opposite to the leg wearing the walking assistant harness.

The connecting position adjustment mechanism may be constituted by a plurality of connecting holes formed in the thigh frame side by side along the right-left direction of the trainee, and the thigh fixation belt may include a protruding portion to be engaged with any of the plurality of connecting holes.

In the above aspect, the thigh frame has the plurality of connecting holes formed side by side along the right-left direction of the trainee. By appropriately selecting a connecting hole to be engaged with the protruding portion of the thigh fixation belt from among the plurality of connecting holes formed in the thigh fixation belt depending on a build of a trainee, it is possible to adjust the connecting position of the thigh frame with the thigh fixation belt in the right-left direction of the trainee. This makes it possible to restrain the thigh frame from interfering with the leg opposite to the leg wearing the walking assistant harness.

The connecting position adjustment mechanism may be constituted by a plurality of through-holes provided in the thigh frame side by side along the right-left direction of the trainee, and the thigh fixation belt may have a screw hole to be threadedly engaged with a bolt inserted into any of the plurality of through-holes.

The connecting position adjustment mechanism may be constituted by an elongated hole provided in the thigh frame so as to extend along the right-left direction, the thigh fixation belt may have an insertion hole, and a position of the thigh fixation belt with respect to the thigh frame may be fixed such that a clamp is inserted into the insertion hole and the elongated hole so as to sandwich the thigh frame and the thigh fixation belt.

The connecting position adjustment mechanism may be constituted by a plurality of hooks provided in the thigh frame side by side along the right-left direction of the trainee, and an end of the thigh fixation belt may be provided with a wire configured to be hooked to any of the plurality of hooks.

In addition, the walking assistant harness may further include: a lower leg frame rotatably connected to the thigh frame via a knee joint portion and placed along a lower leg of the trainee; and a sole frame connected to the lower leg frame and attached to a foot of the trainee.

In a case where the walking assistant harness is configured to further include the lower leg frame and the sole frame, when the walking assistant harness is attached to the leg of the trainee, the lower leg frame and the sole frame may not fit the leg properly. By adjusting the connecting position of the thigh frame with the thigh fixation belt in the right-left direction by the connecting position adjustment mechanism of the thigh frame, it is possible to finely adjust the lower leg frame and the sole frame to be fitted to the leg of the trainee.

With the present disclosure, it is possible to restrain the thigh frame from interfering with a leg opposite to a leg wearing the walking assistant harness, regardless of a build of a trainee.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

With reference to drawings, the following describes embodiments of the present disclosure. The following description and drawings are omitted or simplified appropriately for clarification of the description. In each of the drawings, the same element has the same reference sign, and a redundant description is omitted as needed. Further, in the following drawings, an X-axis positive direction is assumed a front side, an X-axis negative direction is assumed a rear side, a Y-axis positive direction is assumed a left side, a Y-axis negative direction is assumed a right side, a Z-axis positive direction is assumed an upper side, and a Z-axis negative direction is assumed a lower side. Note that the front and rear sides, the right and left sides, and the upper and lower sides are defined based on a trainee who wears a walking assistant harness.

Figure 1:
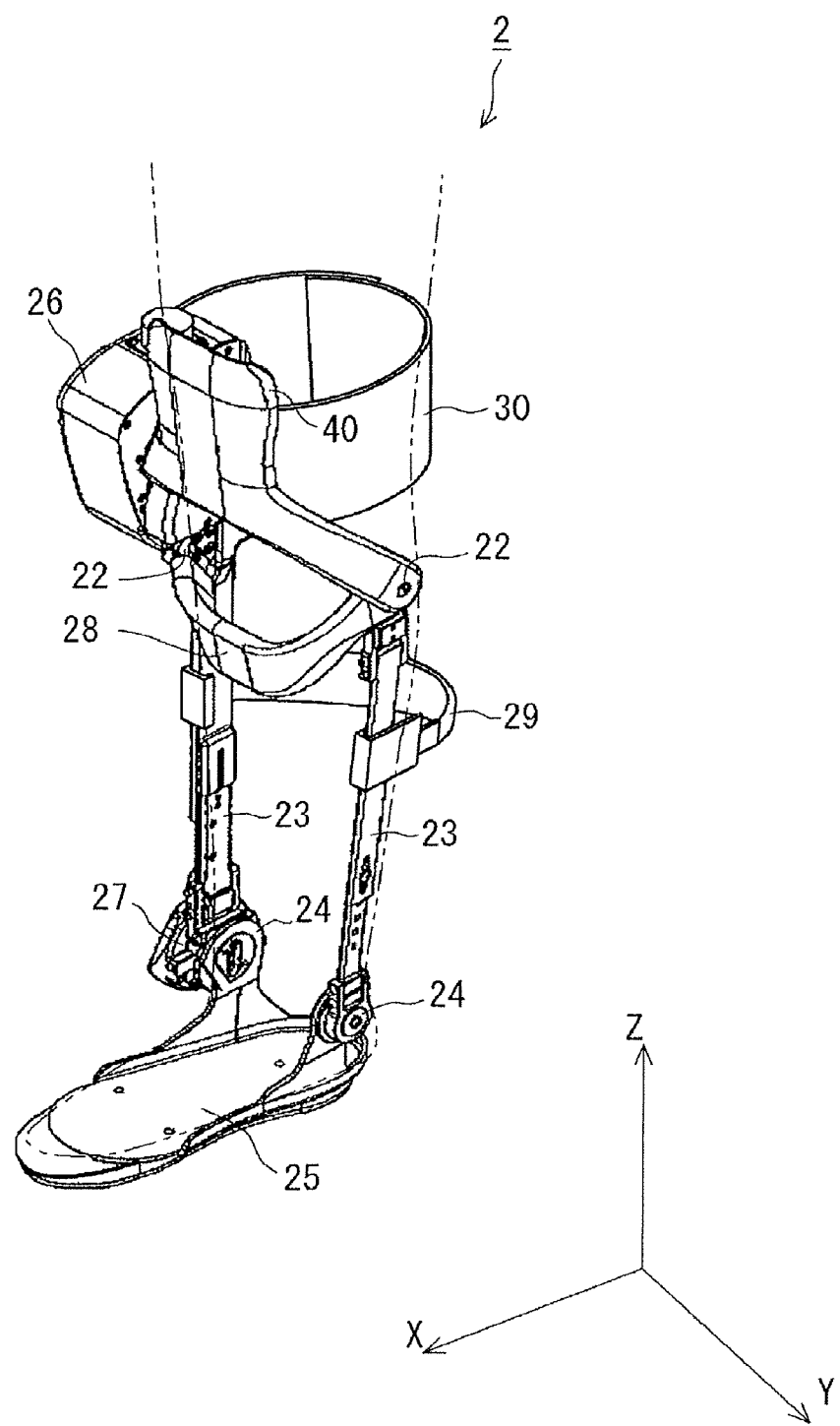
FIG. 1 is a perspective view illustrating a schematic configuration of a walking assistant harness according to the present embodiment.

First, with reference to FIG. 1, a schematic configuration of a walking assistant harness 2 according to the present embodiment will be described. Here, the walking assistant harness 2 is included in a walk training apparatus configured to perform walking training of a trainee such as a patient with hemiparesis after stroke, for example, and is intended to be attached to an affected leg of the trainee so as to assist walking of the trainee. FIG. 1 is a perspective view illustrating a schematic configuration of the walking assistant harness 2. As illustrated in FIG. 1, the walking assistant harness 2 includes a thigh frame 40, a thigh fixation belt 30, a lower leg frame 23, a sole frame 25 and a motor unit 26.

The thigh frame 40 is placed along a front side or a rear side of a thigh of the trainee. In FIG. 1, the thigh frame 40 is placed along the front side of the thigh of the trainee. The thigh fixation belt 30 is connected to the thigh frame 40 at a connection portion, so as to fix the thigh of the trainee to the thigh frame 40. The connection portion includes a connecting position adjustment mechanism configured to adjust a connecting position with the thigh fixation belt 30 in a right-left direction (a Y-axis direction) of the trainee. A detailed configuration of the thigh fixation belt 30, and a configuration around the connection portion of the thigh frame 40 with the thigh fixation belt 30 will be described later. Further, the thigh frame 40 is provided with an oblong first frame 28 extending in the right-left direction (the Y-axis direction) so as to be connected to a wire of a tensile mechanism in the walk training apparatus.

The lower leg frame 23 is rotatably connected to the thigh frame 40 via a knee joint portion 22. The lower leg frame 23 is attached to a lower leg of the trainee. The motor unit 26 rotationally drives the knee joint portion 22. Further, the lower leg frame 23 is provided with an oblong second frame 29 extending in the right-left direction and configured such that a wire of the tensile portion in the walk training apparatus is connected thereto.

The sole frame 25 is connected to the lower leg frame 23 via an ankle joint portion 24. The sole frame 25 is attached to a foot of a leg of the trainee. A load sensor is provided in the sole frame 25. The load sensor is, for example, a normal load sensor for detecting a normal load applied to a sole of the sole frame 25. The load sensor outputs a detected load value applied to the sole of the sole frame 25 to a controlling portion of the walk training apparatus. The ankle joint portion 24 may be provided with an adjustment mechanism 27 configured to adjust a movable range and a motor unit configured to rotationally drive the ankle joint portion 24.

Note that the configuration of the walking assistant harness 2 is an example, and the walking assistant harness 2 is not limited to this. The walking assistant harness 2 should include at least the thigh frame 40 and the thigh fixation belt 30.

Figure 2:
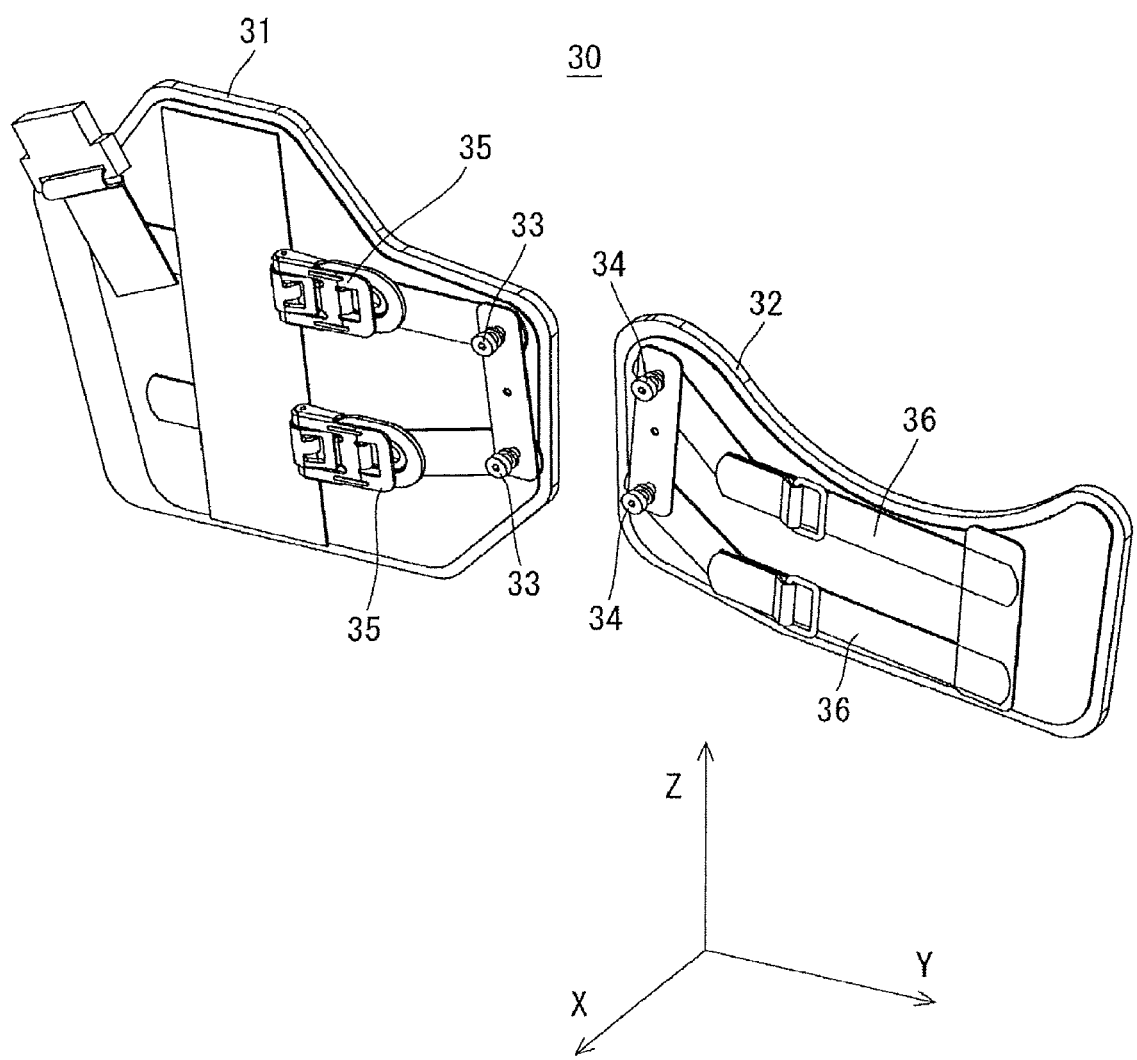
FIG. 2 is a perspective view illustrating a configuration of a thigh fixation belt of the walking assistant harness according to the present embodiment.

Next will be described a configuration of the thigh fixation belt 30 in detail. FIG. 2 is a perspective view illustrating the configuration of the thigh fixation belt 30. As illustrated in FIG. 2, the thigh fixation belt 30 is constituted by a first wing 31 and a second wing 32. The first wing 31 includes stoppers 35 and protruding portions 33. The protruding portion 33 includes a cylindrical head and a cylindrical support portion having a diameter smaller than the head and is configured such that one end of the support portion is fixed to the first wing 31 and the head is provided in the other end of the support portion. The second wing 32 includes bands 36 and protruding portions 34. The protruding portion 34 has a shape similar to the protruding portion 33. That is, the protruding portion 34 has a cylindrical head and a cylindrical support portion having a diameter smaller than the head and is configured such that one end of the support portion is fixed to the second wing 32 and the head is provided in the other end of the support portion. The protruding portions 33 and the protruding portions 34 constitute a part of the connection portion that connects the thigh fixation belt 30 to the thigh frame 40. Note that the protruding portions 33 of the first wing 31 and the protruding portions 34 of the second wing 32 are provided at two places in an up-down direction (a Z-axis direction), but are not limited to this. They may be provided at two or more places in the up-down direction (the Z-axis direction). Further, instead of the configuration in which the protruding portions 33 of the first wing 31 and the protruding portions 34 of the second wing 32 are provided at two places in the up-down direction (the Z-axis direction), the protruding portion 33 of the first wing 31 and the protruding portion 34 of the second wing 32 may be provided only at one place.

Figure 3:
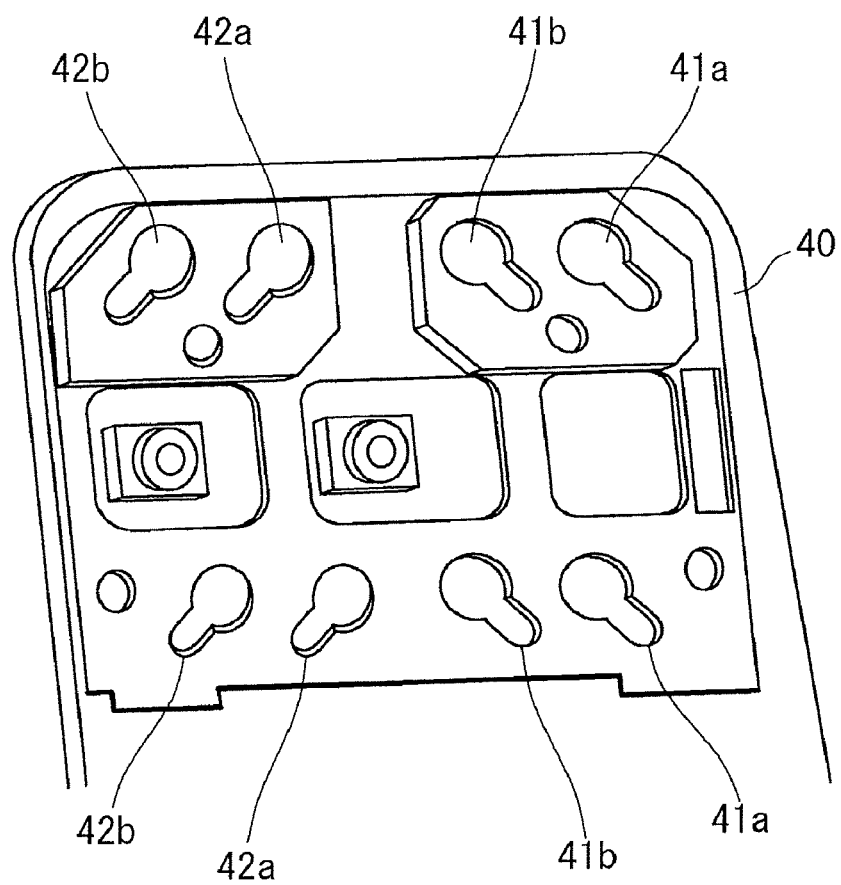
FIG. 3 is a perspective view illustrating a configuration around a connection portion of a thigh frame with the thigh fixation belt in the walking assistant harness according to the present embodiment.

FIG. 3 is a perspective view illustrating a configuration around the connection portion of the thigh frame 40 with the thigh fixation belt 30. Note that FIG. 3 is a view of the thigh frame 40 when viewed from the X-axis positive direction. As illustrated in FIG. 3, the thigh frame 40 has connecting holes 41*a*, 41*b*, 42*a*, 42*b* formed as connecting position adjustment mechanisms in the connection portion that connects the thigh fixation belt 30 to the thigh frame 40. The connecting hole 41*a* and the connecting hole 41*b* are formed side by side along the right-left direction. Similarly, the connecting hole 42*a* and the connecting hole 42*b* are formed side by side along the right-left direction. The connecting hole 41*a*, 41*b* is constituted by an attachment hole to which the protruding portion 33 is fixed, an insertion hole having a diameter larger than the attachment hole and configured such that the head of the protruding portion 33 can pass therethrough, and a communication passage via which the attachment hole communicates with the insertion hole. Similarly, the connecting hole 42*a*, 42*b* is constituted by an attachment hole to which the protruding portion 34 is fixed, an insertion hole having a diameter larger than the attachment hole and configured such that the head of the protruding portion 34 can pass therethrough, and a communication passage via which the attachment hole communicates with the insertion hole.

The connecting hole 41*a*, 41*b* is formed such that the attachment hole is placed on the lower side (the Z-axis negative direction) and the right side (the Y-axis negative direction) relative to the insertion hole. The connecting hole 42*a*, 42*b* is formed such that the attachment hole is placed on the lower side (the Z-axis negative direction) and the left side (the Y-axis positive direction) relative to the insertion hole. This makes it possible to prevent a position of the thigh frame 40 from moving upward (in the Z-axis positive direction) relative to the thigh fixation belt 30 during walking training.

Note that the connecting holes 41*a*, 41*b*, 42*a*, 42*b* are provided at two places in the up-down direction (the Z-axis direction), but are not limited to this. They may be provided at two or more places in the up-down direction (the Z-axis direction). Further, instead of the configuration in which the connecting holes 41*a*, 41*b*, 42*a*, 42*b* are provided at two places in the up-down direction, the connecting hole 41*a*, 41*b*, 42*a*, 42*b* may be provided only at one place. In the thigh frame 40, the connecting holes (the connecting holes 41*a*, 41*b*) with which the protruding portion 33 of the first wing 31 is engageable are formed side by side at two places along the right-left direction, but the present embodiment is not limited to this. In the thigh frame 40, the connecting holes with which the protruding portion 33 of the first wing 31 is engageable may be formed side by side at two or more places along the right-left direction. Similarly, in the thigh frame 40, the connecting holes (the connecting holes 42*a*, 42*b*) with which the protruding portion 34 of the second wing 32 is engageable are formed side by side at two places along the right-left direction, but the present embodiment is not limited to this. In the thigh frame 40, the connecting holes with which the protruding portion 34 of the second wing 32 is engageable may be formed side by side at two or more places along the right-left direction.

Figure 4:
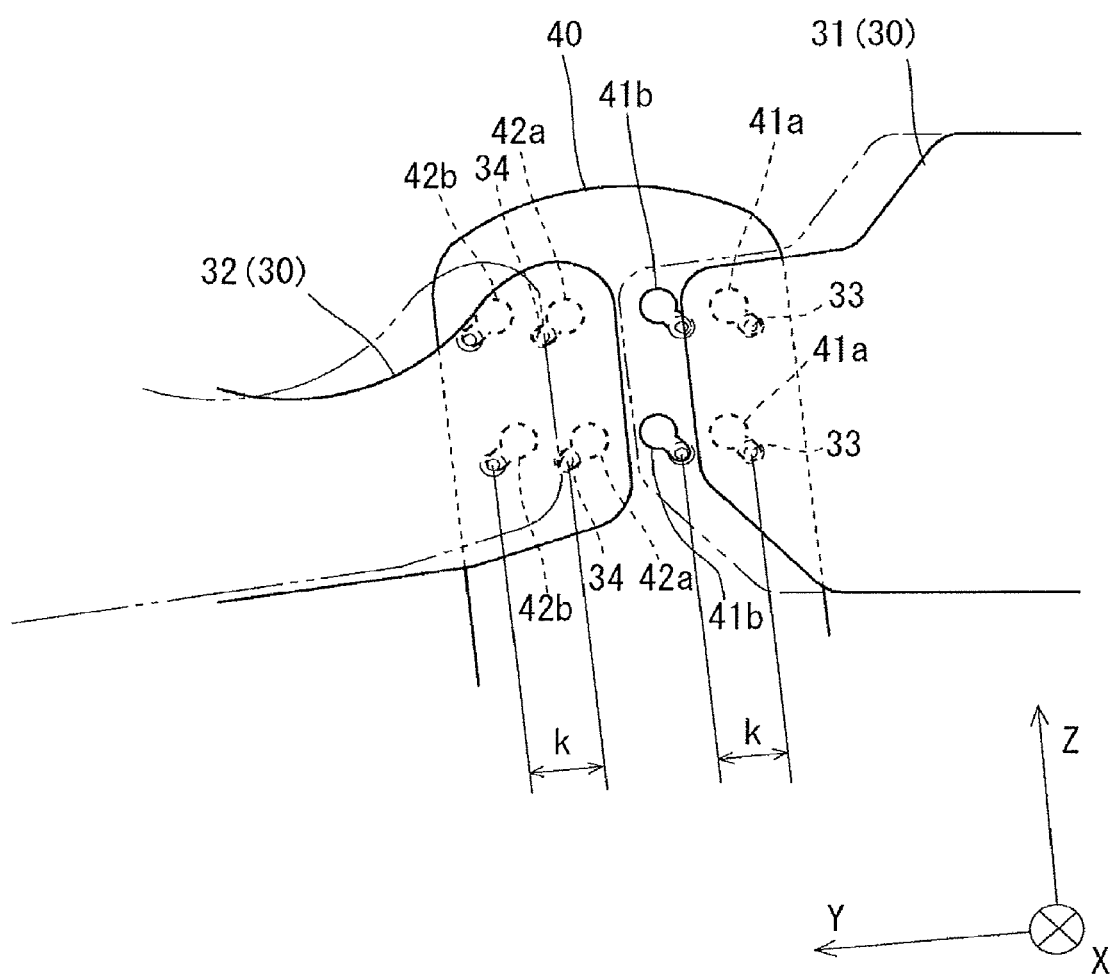
FIG. 4 is a schematic view illustrating a connecting state of the thigh frame with a first wing and a second wing in a case where the thigh frame is attached to an affected leg of a trainee with a large build.

FIG. 4 is a schematic view illustrating a connecting state of the thigh frame 40 with the first wing 31 and the second wing 32 in a case where the thigh frame 40 is attached to an affected leg of a trainee with a large build. Note that, similarly to FIG. 3, FIG. 4 is a view of the thigh frame 40 when viewed from the X-axis positive direction. Here, it is assumed that the affected leg of the trainee is a right leg. As illustrated in FIG. 4, the thigh frame 40 is connected to the first wing 31 such that the protruding portions 33 of the first wing 31 are fitted to the connecting holes 41*a* of the thigh frame 40. Similarly, the thigh frame 40 is connected to the second wing 32 such that the protruding portions 34 of the second wing 32 are fitted to the connecting holes 42*a* of the thigh frame 40.

In the meantime, in a case where the thigh frame 40 is attached to an affected leg of a trainee with a small build, the thigh frame 40 is connected to the first wing 31 such that the protruding portions 33 of the first wing 31 are fitted to the connecting holes 41*b* of the thigh frame 40, and the thigh frame 40 is connected to the second wing 32 such that the protruding portions 34 of the second wing 32 are fitted to the connecting holes 42*b* of the thigh frame 40. In FIG. 4, the first wing 31 and the second wing 32 in the case where the thigh frame 40 is attached to the affected leg of the trainee with a small build are indicated by an alternate long and two short dashes line. That is, a connecting position between the thigh frame 40 and the first wing 31 and a connecting position between the thigh frame 40 and the second wing 32 can be moved only by k toward a leg (a left leg) opposite to the affected leg, that is, the Y-axis positive direction, as compared to the case where the thigh frame 40 is attached to the affected leg of the trainee with a large build.

Figure 5:
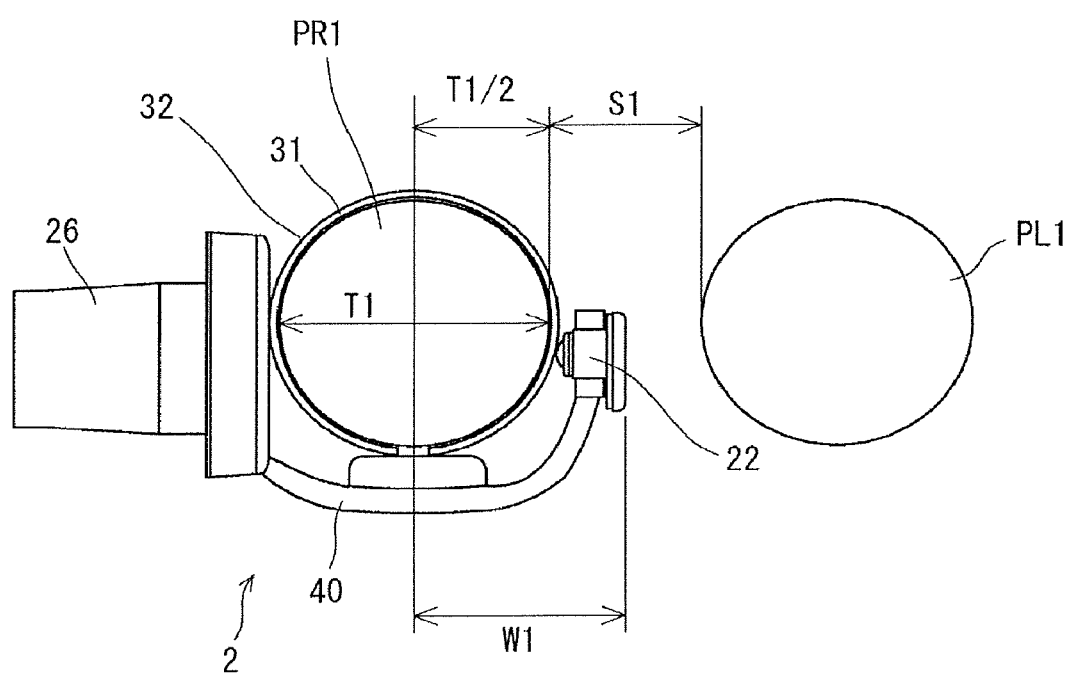
FIG. 5 is a schematic view illustrating a state where the thigh frame is attached to the affected leg of the trainee with a large build.

FIG. 5 is a schematic view illustrating a state where the thigh frame 40 is attached to an affected leg PR1 of a trainee with a large build. Here, it is assumed that the affected leg PR1 of the trainee is a right leg. Further, a leg opposite to the affected leg PR1 is assumed a healthy leg PL1. As illustrated in FIG. 5, a distance between the affected leg PR1 and the healthy leg PL1 when viewed from an X-axis direction (the front-rear direction) is assumed S1. A width of the affected leg PR1 when viewed from the X-axis direction (the front-rear direction) is assumed T1. Further, a distance from a central position of the width of the affected leg PR1 to an end of the thigh frame 40 on a side closer to the healthy leg PL1 when viewed from the X-axis direction (the front-rear direction) is assumed W1. Here, S1+T1/2>W1 is satisfied, so that the thigh frame 40 does not make contact with the healthy leg PL1.

Figure 6:
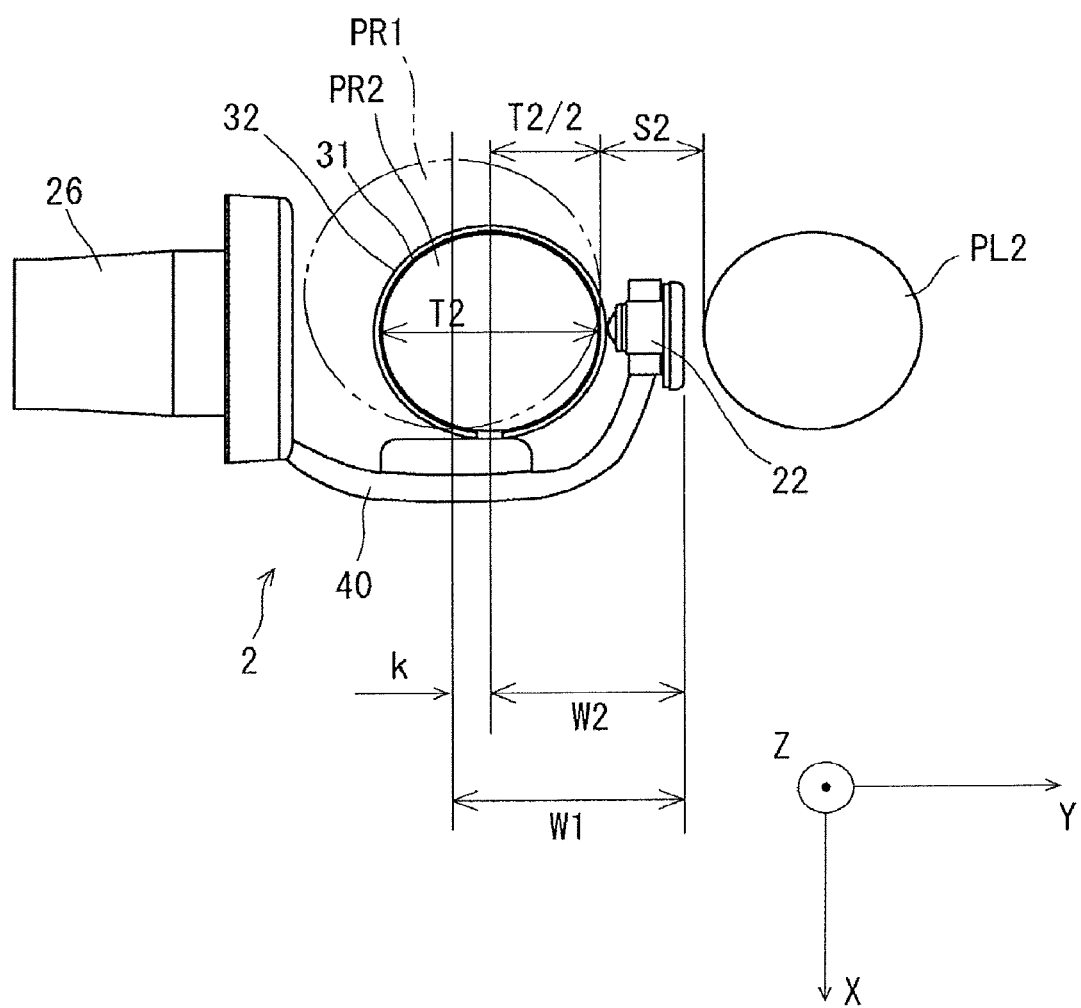
FIG. 6 is a schematic view illustrating a state where the thigh frame is attached to an affected leg of a trainee with a small build.

FIG. 6 is a schematic view illustrating a state where the thigh frame 40 is attached to an affected leg PR2 of a trainee with a small build. Here, it is assumed that the affected leg PR2 of the trainee is a right leg. Further, a leg opposite to the affected leg PR2 is assumed a healthy leg PL2. As illustrated in FIG. 6, a distance between the affected leg PR2 and the healthy leg PL2 when viewed from the X-axis direction (the front-rear direction) is assumed S2. A width of the affected leg PR2 when viewed from the X-axis direction (the front-rear direction) is assumed T2. Further, a distance from a central position of the width of the affected leg PR2 to an end of the thigh frame 40 on a side closer to the healthy leg PL2 when viewed from the X-axis direction (the front-rear direction) is assumed W2. S2 in FIG. 6 is smaller than S1 in FIG. 5 (S2<S1). T2 in FIG. 6 is smaller than T1 in FIG. 5 (T2<T1).

As described with reference to FIG. 4, in the case of the trainee with a large build, the protruding portions 33 of the first wing 31 are fixed to the connecting holes 41a of the thigh frame 40 and the protruding portions 34 of the second wing 32 are fixed to the connecting holes 42a of the thigh frame 40. On the other hand, in the case of the trainee with a small build, the protruding portions 33 of the first wing 31 are fixed to the connecting holes 41b of the thigh frame 40 and the protruding portions 34 of the second wing 32 are fixed to the connecting holes 42b of the thigh frame 40. That is, in the case of the trainee with a small build, the connecting position between the thigh frame 40 and the first wing 31 and the connecting position between the thigh frame 40 and the second wing 32 are moved only by k toward the leg (the left leg) opposite to the affected leg, namely, toward the Y-axis positive direction, as compared with the case of the trainee with a large build. On this account, W2 in FIG. 6 is smaller than W1 in FIG. 5 only by k (W2=W1−k).

In the case where the thigh frame 40 is attached to the affected leg PR2 of the trainee with a small build, if the first wing 31 and the second wing 32 are connected to the thigh frame 40 at the same connecting positions as the case where the thigh frame 40 is attached to the affected leg PR1 of the trainee with a large build, the thigh frame 40 makes contact with the healthy leg PL2. That is, in the case where the thigh frame 40 is attached to the affected leg PR2 of the trainee with a small build, if the protruding portions 33 of the first wing 31 are fixed to the connecting holes 41a of the thigh frame 40 and the protruding portions 34 of the second wing 32 are fixed to the connecting holes 42a of the thigh frame 40 (see FIG. 4), S2+T2/2<W1 is established, so that the thigh frame 40 makes contact with the healthy leg PL2.

In contrast, in the case where the thigh frame 40 is attached to the affected leg PR2 of the trainee with a small build, if the protruding portions 33 of the first wing 31 are inserted into the connecting holes 41b of the thigh frame 40 and the protruding portions 34 of the second wing 32 are inserted into the connecting holes 42b of the thigh frame 40 (see FIG. 4), S2+T2/2>W2 is satisfied, so that the thigh frame 40 does not make contact with the healthy leg PL2.

Since respective positions where the first wing 31 and the second wing 32 are connected to the thigh frame 40 are selected depending on a build of a trainee as such, even in the case where the thigh frame 40 is attached to the affected leg of the trainee with a small build, it is possible to restrain the thigh frame 40 from making contact with the leg opposite to the affected leg.

[First Modification]

Figure 7:
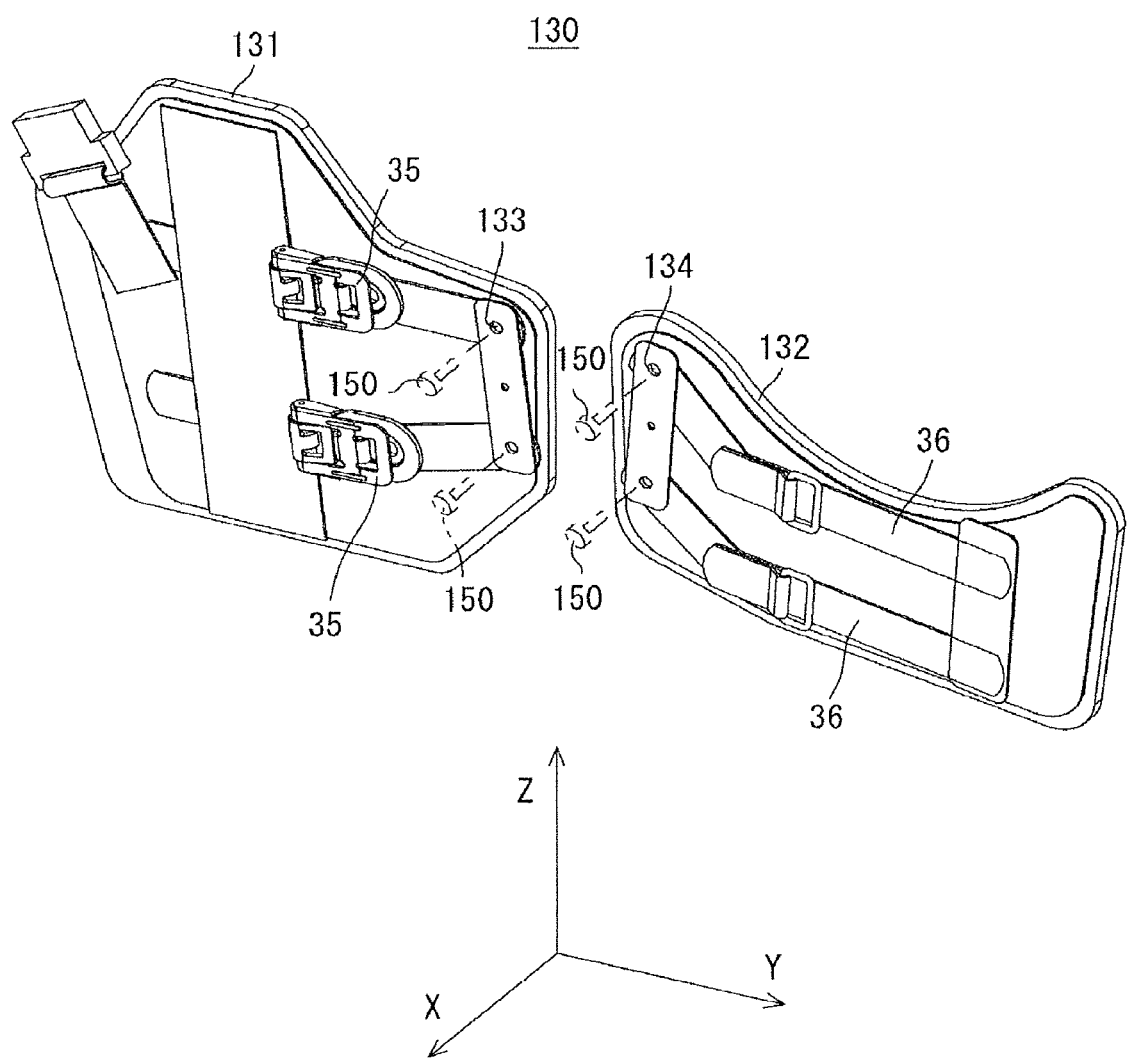
FIG. 7 is a perspective view illustrating a configuration of a thigh fixation belt in the First Modification.

FIG. 7 is a perspective view illustrating a configuration of a thigh fixation belt 130 in the First Modification. As illustrated in FIG. 7, the thigh fixation belt 130 is constituted by a first wing 131 and a second wing 132. Similarly to the first wing 31 illustrated in FIG. 2, the first wing 131 includes stoppers 35. Similarly to the second wing 32 illustrated in FIG. 2, the second wing 132 includes bands 36. In the first wing 131, screw holes 133 to be threadedly engaged with bolts 150 are formed at positions corresponding to the protruding portions 33 of the first wing 31 illustrated in FIG. 2. In the second wing 132, screw holes 134 to be threadedly engaged with bolts 150 are formed at positions corresponding to the protruding portions 34 of the second wing 32 illustrated in FIG. 2. The screw holes 133, the screw holes 134, and the bolts 150 constitute a part of a connection portion that connects the thigh fixation belt 130 to a thigh frame 140. Note that the screw holes 133 of the first wing 131 and the screw holes 134 of the second wing 132 are provided at two places in the up-down direction (the Z-axis direction), but are not limited to this. They may be provided at two or more places in the up-down direction (the Z-axis direction). Further, instead of the configuration in which the screw holes 133 of the first wing 131 and the screw holes 134 of the second wing 132 are provided at two places in the up-down direction (the Z-axis direction), the screw hole 133 of the first wing 131 and the screw hole 134 of the second wing 132 may be provided only at one place.

Figure 8:
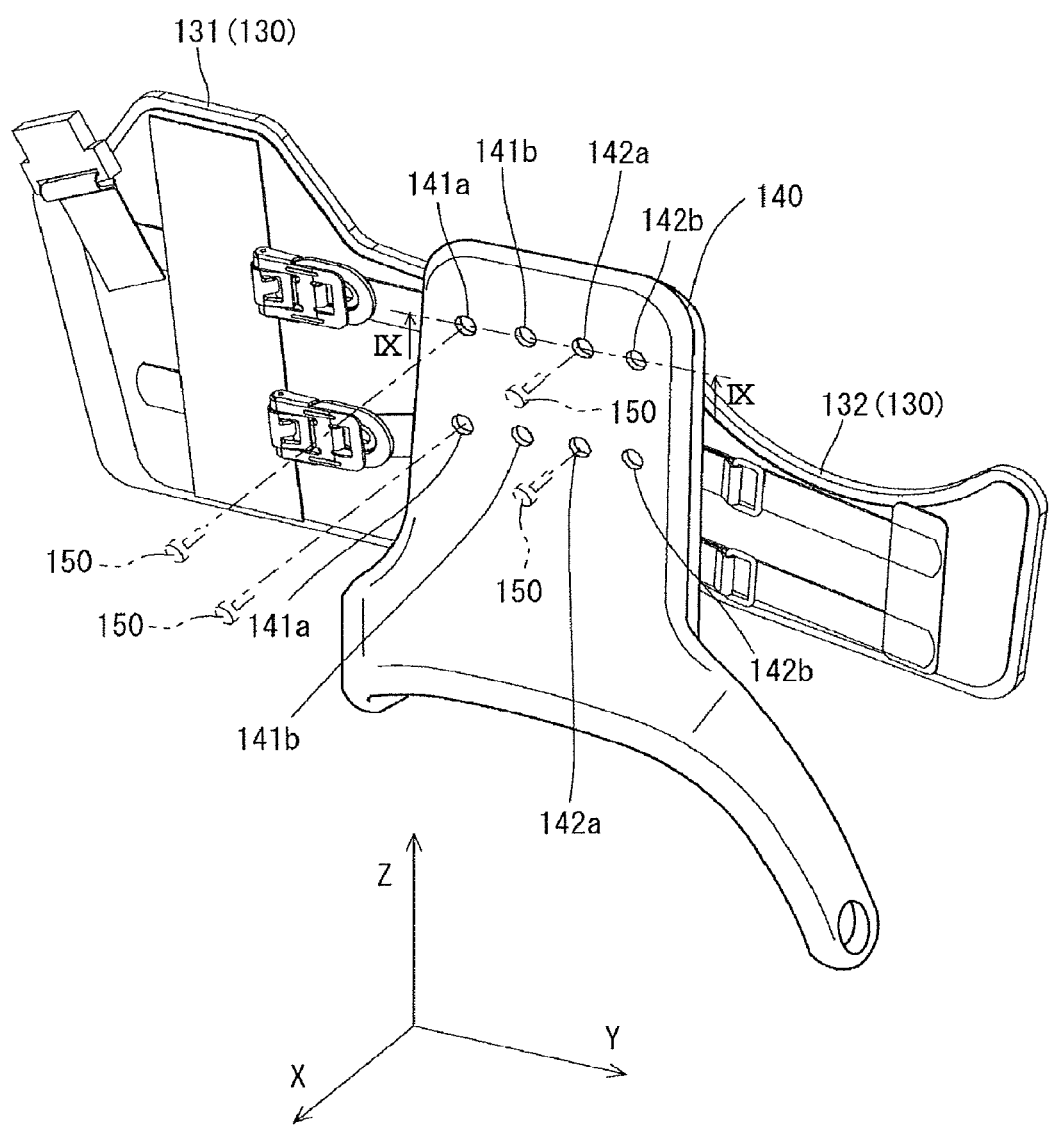
FIG. 8 is a perspective view illustrating a configuration around a connection portion of a thigh frame with the thigh fixation belt in the First Modification.

FIG. 8 is a perspective view illustrating a configuration around the connection portion of the thigh frame 140 with the thigh fixation belt 130 in the First Modification. Note that a basic configuration of the thigh frame 140 is the same as the thigh frame 40 illustrated in FIG. 1. The thigh frame 140 is different from the thigh frame 40 in a configuration of the connection portion. As illustrated in FIG. 8, the thigh frame 140 has through-holes 141a, 141b, 142a, 142b formed as connecting position adjustment mechanisms in the connection portion that connects the thigh fixation belt 130 to the thigh frame 140. The through-holes 141a, 141b, 142a, 142b are holes into which the bolts 150 are inserted. Respective positions where the through-holes 141a, 141b, 142a, 142b are formed in the thigh frame 140 correspond to the positions where the connecting holes 41a, 41b, 42a, 42b are provided in the thigh frame 40 illustrated in FIG. 3. That is, the through-hole 141a and the through-hole 141b are formed side by side along the right-left direction, and the through-hole 142a and the through-hole 142b are formed side by side along the right-left direction.

Note the through-holes 141a, 141b, 142a, 142b are provided at two places in the up-down direction (the Z-axis direction), but are not limited to this. They may be provided at two or more places in the up-down direction (the Z-axis direction). Further, instead of the configuration in which the through-holes 141a, 141b, 142a, 142b are provided at two places in the up-down direction (the Z-axis direction), the through-hole 141a, 141b, 142a, 142b may be provided only at one place. In the thigh frame 140, the through-holes (the through-holes 141a, 141b) provided to correspond to the screw holes 133 of the first wing 131 are formed side by side at two places along the right-left direction, but are not limited to this. In the thigh frame 140, the through-holes provided to correspond to the screw holes 133 of the first wing 131 may be formed side by side at two or more places along the right-left direction. Similarly, in the thigh frame 140, the through-holes (the through-holes 142a, 142b) provided to correspond to the screw holes 134 of the second wing 132 are formed side by side at two places along the right-left direction, but the present embodiment is not limited to this. In the thigh frame 140, the through-holes provided to correspond to the screw holes 134 of the second wing 132 may be formed side by side at two or more places along the right-left direction.

Figure 9:
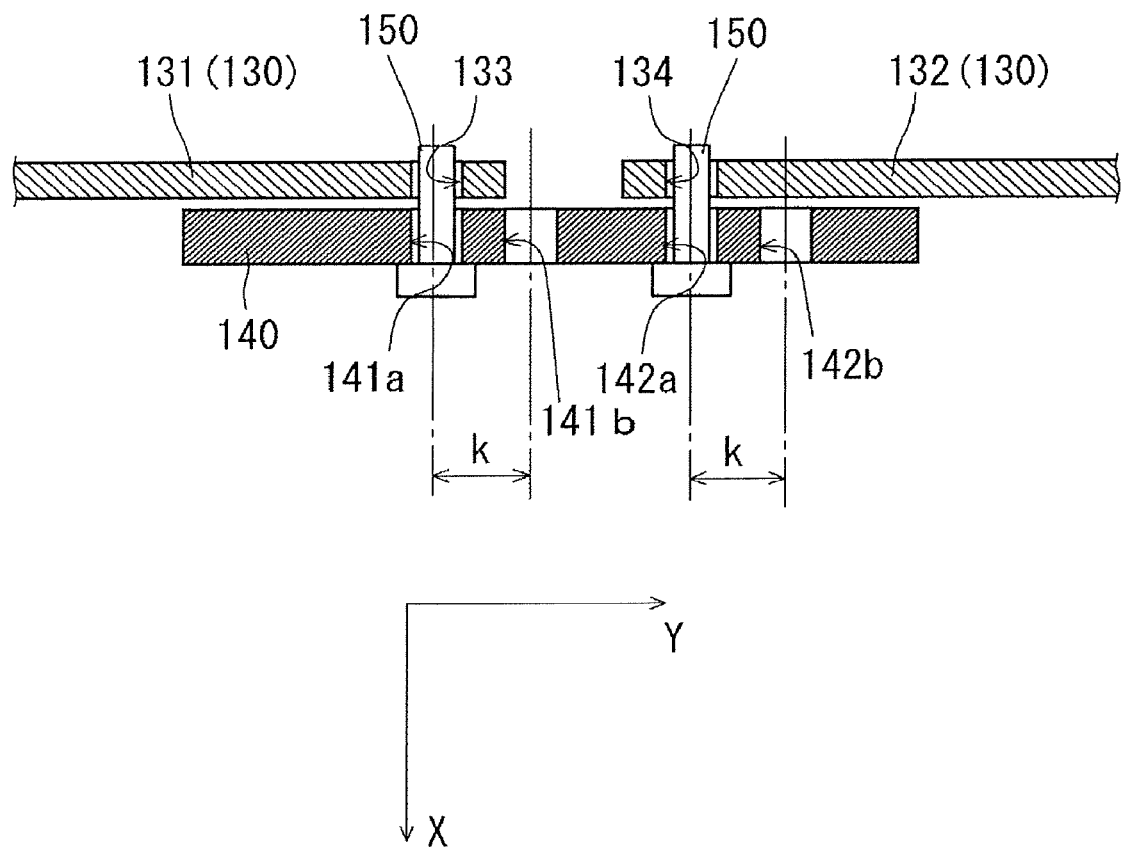
FIG. 9 is a schematic view illustrating a connecting state of the thigh frame with a first wing and a second wing of the First Modification in a case where the thigh frame of the First Modification is attached to an affected leg of a trainee with a large build.

FIG. 9 is a schematic view illustrating a connecting state of the thigh frame 140 with the first wing 131 and the second wing 132 in a case where the thigh frame 140 is attached to an affected leg of a trainee with a large build. Note that FIG. 9 corresponds to a section along a IX-IX line in FIG. 8. Here, it is assumed that the affected leg of the trainee is a right leg. As illustrated in FIG. 9, the bolt 150 is inserted into the through-hole 141a of the thigh frame 140 and threadedly engaged with the screw hole 133 formed in the first wing 131, so that the thigh frame 140 is connected to the first wing 131. Further, the bolt 150 is inserted into the through-hole 142a of the thigh frame 140 and threadedly engaged with the screw hole 134 formed in the second wing 132, so that the thigh frame 140 is connected to the second wing 132.

On the other hand, in a case where the thigh frame 140 is attached to an affected leg of a trainee with a small build, the bolt 150 is inserted into the through-hole 141b of the thigh frame 140 and threadedly engaged with the screw hole 133 formed in the first wing 131, so that the thigh frame 140 is connected to the first wing 131. Further, the bolt 150 is inserted into the through-hole 142b of the thigh frame 140 and threadedly engaged with the screw hole 134 formed in the second wing 132, so that the thigh frame 140 is connected to the second wing 132. That is, as compared to the case where the thigh frame 140 is attached to the affected leg of the trainee with a large build, a connecting position between the thigh frame 140 and the first wing 131 and a connecting position between the thigh frame 140 and the second wing 132 can be moved only by k toward a leg (a left leg) opposite to the affected leg, namely, toward the Y-axis positive direction.

[Second Modification]

Figure 10:
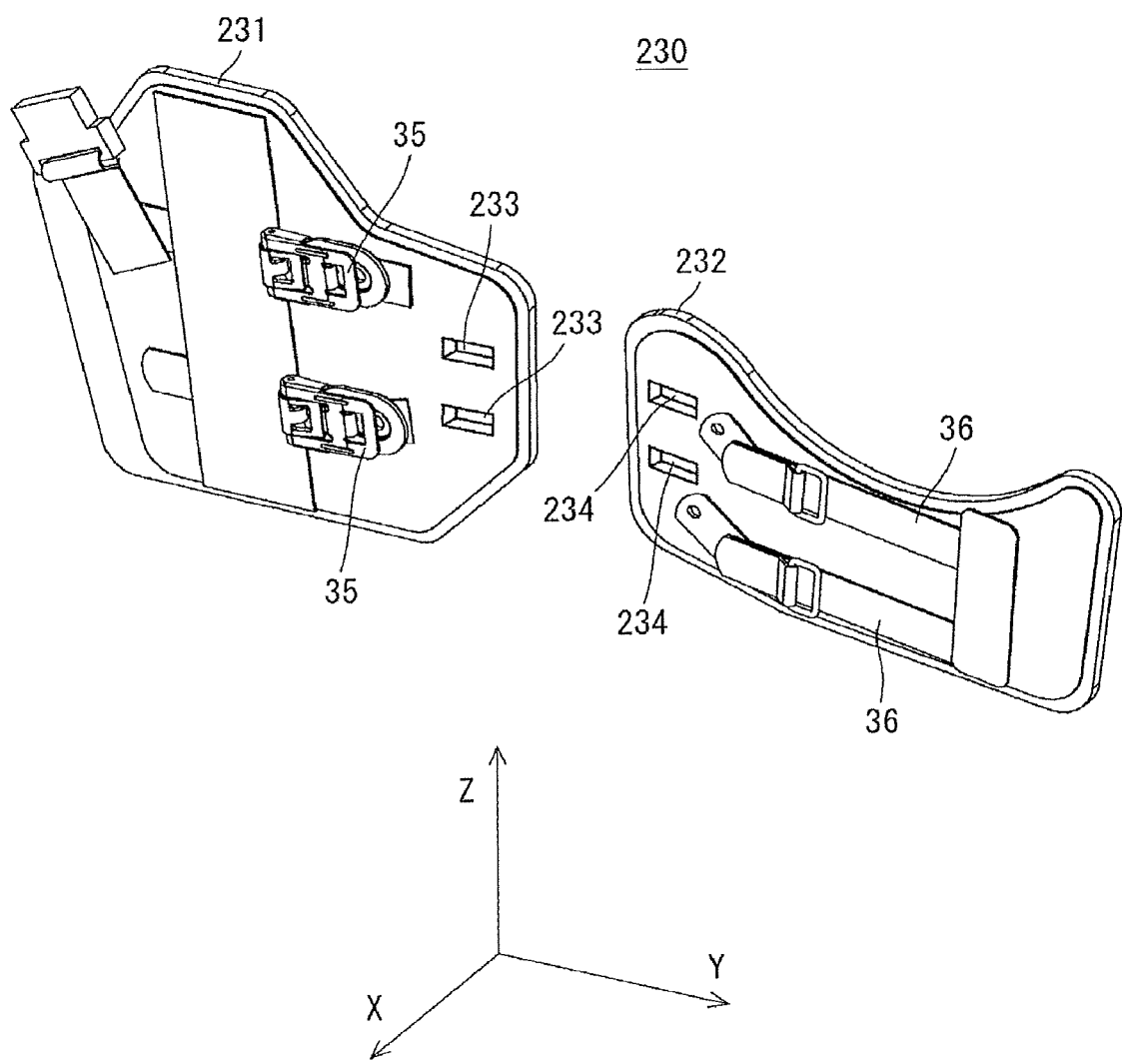
FIG. 10 is a perspective view illustrating a configuration of a thigh fixation belt in the Second Modification.

FIG. 10 is a perspective view illustrating a configuration of a thigh fixation belt 230 in the Second Modification. As illustrated in FIG. 10, the thigh fixation belt 230 is constituted by a first wing 231 and a second wing 232. Similarly to the first wing 31 illustrated in FIG. 2, the first wing 231 includes stoppers 35. Similarly to the second wing 32 illustrated in FIG. 2, the second wing 232 includes bands 36.

In the first wing 231, insertion holes 233 through which heads 250c of respective clamps 250 (described later) can pass are formed at positions corresponding to the protruding portions 33 of the first wing 31 illustrated in FIG. 2. In the second wing 232, insertion holes 234 through which heads 250c of respective clamps 250 (described later) can pass are formed at positions corresponding to the protruding portions 34 of the second wing 32 illustrated in FIG. 2. For example, in a case where a sectional shape of the head 250c, perpendicular to an axial direction, is rectangular, the insertion hole 233 and the insertion hole 234 are formed into a rectangular shape corresponding to the sectional shape of the head 250c. The insertion hole 233 and the insertion hole 234 are formed so that their longitudinal directions are along the right-left direction (the Y-axis direction). The insertion holes 233 and the insertion holes 234 constitute a part of a connection portion that connects the thigh fixation belt 230 to a thigh frame 240. Note the insertion holes 233 of the first wing 231 and the insertion holes 234 of the second wing 232 are provided at two places in the up-down direction (the Z-axis direction), but are not limited to this. They may be provided at two or more places in the up-down direction (the Z-axis direction). Further, instead of the configuration in which the insertion holes 233 of the first wing 231 and the insertion holes 234 of the second wing 232 are provided at two places in the up-down direction (the Z-axis direction), the insertion hole 233 of the first wing 231 and the insertion hole 234 of the second wing 232 may be provided only at one place.

Figure 11:
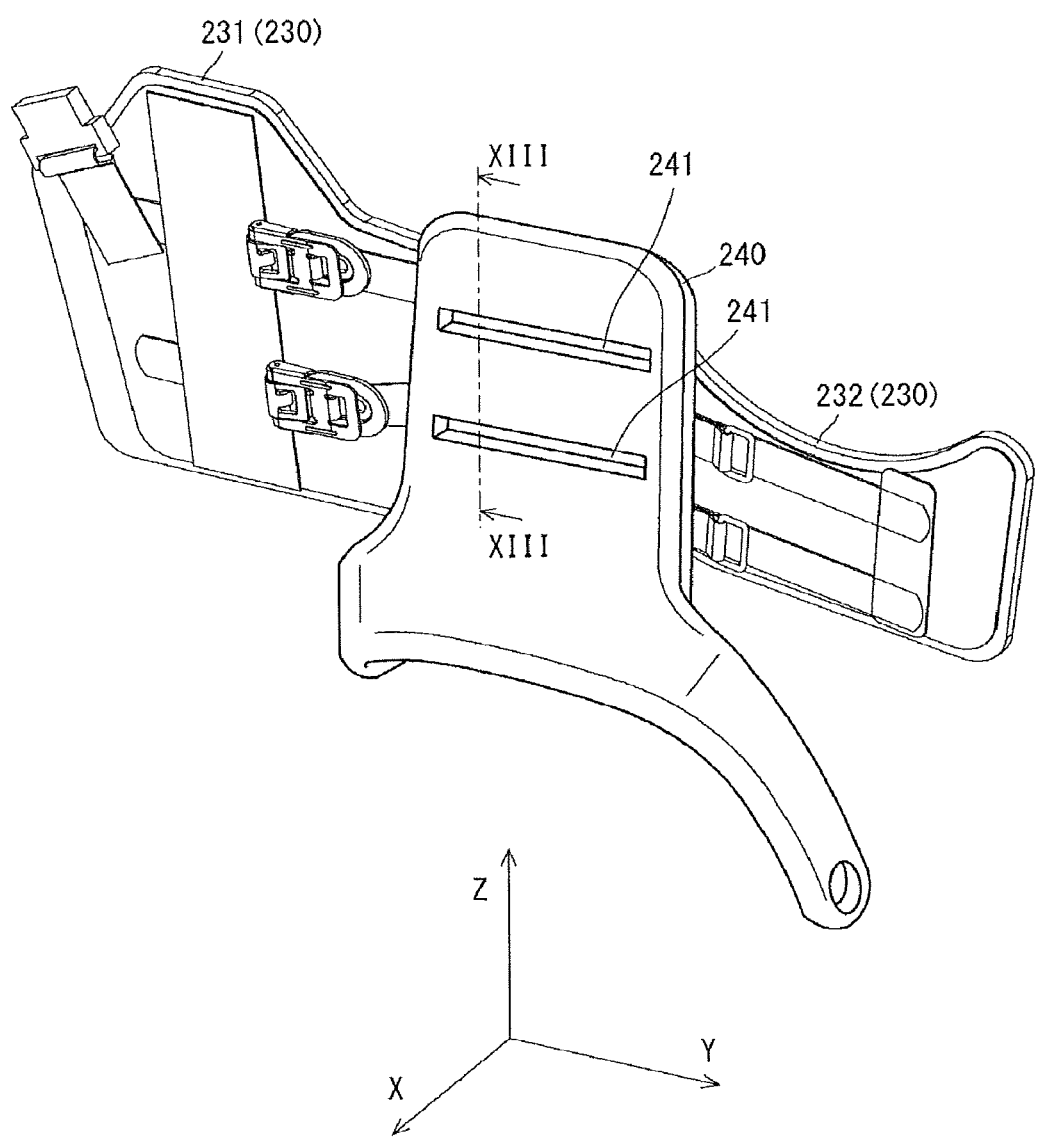
FIG. 11 is a schematic view illustrating a configuration near a part of a thigh frame in the Second Modification to which part the thigh fixation belt is attached.

FIG. 11 is a perspective view illustrating a configuration around a connection portion of the thigh frame 240 with the thigh fixation belt 230 in the Second Modification. Note that a basic configuration of the thigh frame 240 is the same as the thigh frame 40 illustrated in FIG. 1. The thigh frame 240 is different from the thigh frame 40 in a configuration of the connection portion. As illustrated in FIG. 11, the thigh frame 240 has adjustment elongated holes 241 extending along the right-left direction (the Y-axis direction) as connecting position adjustment mechanisms in the connection portion that connects the thigh fixation belt 230 to the thigh frame 240. The adjustment elongated hole 241 is a rectangular elongated hole with its longitudinal direction extending along the right-left direction (the Y-axis direction), for example. Note that the adjustment elongated holes 241 are provided at two places in the up-down direction (the Z-axis direction), but are not limited to this. The adjustment elongated holes 241 may be provided at two or more places in the up-down direction (the Z-axis direction). Further, instead of the configuration in which the adjustment elongated holes 241 are provided at two places in the up-down direction (the Z-axis direction), the adjustment elongated hole 241 may be provided only at one place.

Figure 12:
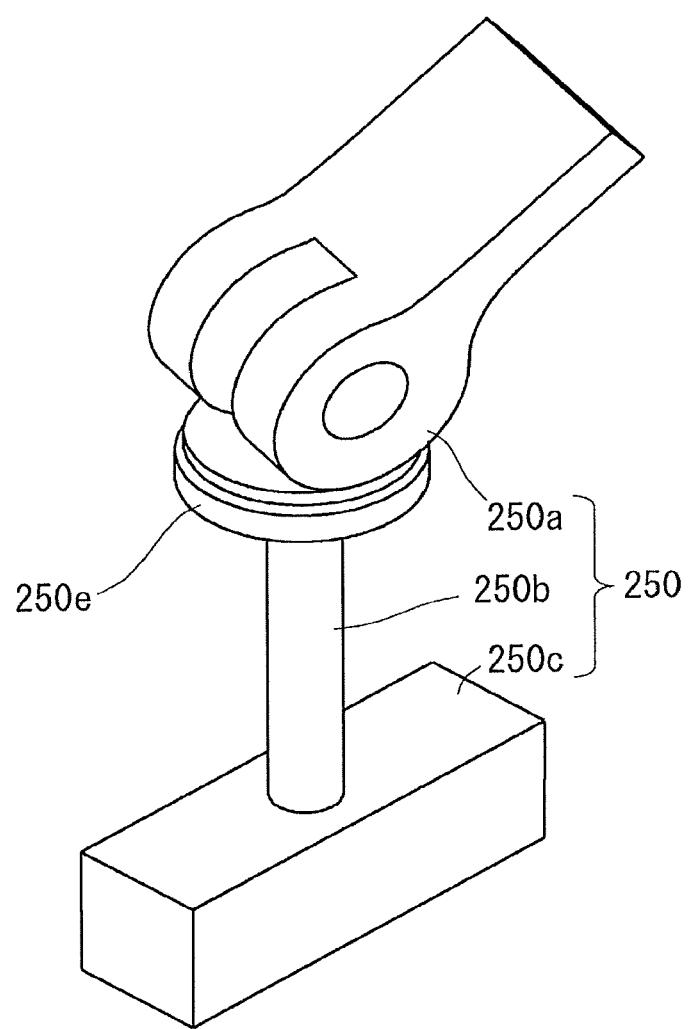
FIG. 12 is a perspective view illustrating a configuration around a connection portion of the thigh frame with the thigh fixation belt in the Second Modification.

FIG. 12 is a perspective view illustrating an appearance of the clamp 250. The clamps 250 constitute the connection portion that connects the thigh fixation belt 230 to the thigh frame 240 together with the insertion holes 233 and the insertion holes 234 of the thigh fixation belt 230 and the adjustment elongated holes 241 of the thigh frame 240. As illustrated in FIG. 12, the clamp 250 includes a lever 250a, a shaft portion 250b, a head 250c, and a movable board 250e. The head 250c is provided in one end of the shaft portion 250b so as to extend perpendicularly to the shaft portion 250b. A shape of the head 250c is a rectangular-solid shape, for example. That is, a sectional shape of the head 250c, perpendicular to the axial direction, is rectangular. The movable board 250e is provided near the other end of the shaft portion 250b so as to be perpendicular to the shaft portion 250b. The movable board 250e is configured to be movable along the shaft portion 250b by an operation of the lever 250a. That is, when the lever 250a is put down, the movable board 250e is pushed down along the shaft portion 250b, so that a distance between the head 250c and the movable board 250e is narrowed.

Figure 13:
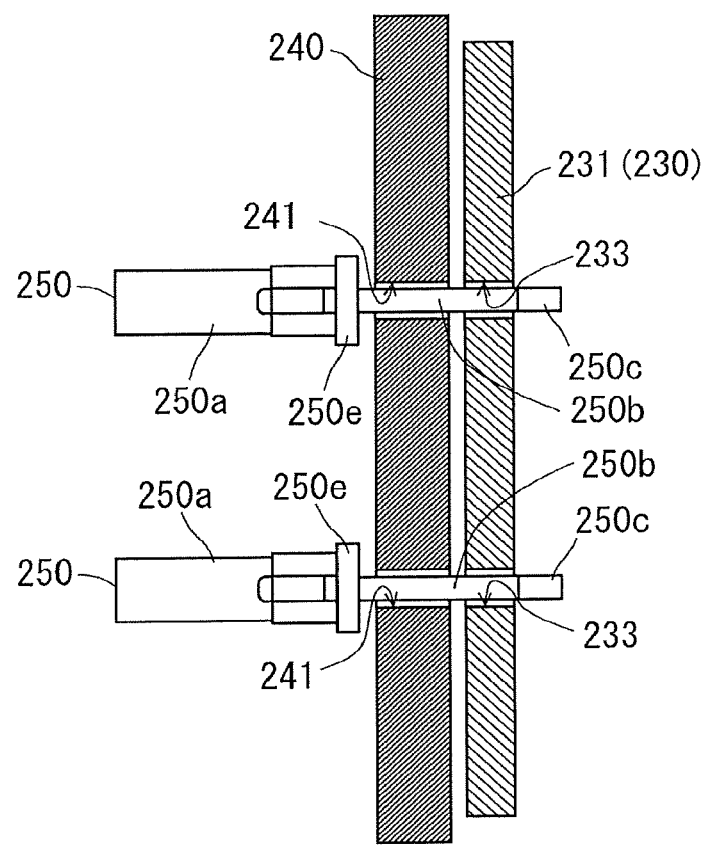
FIG. 13 is a schematic view to describe a connection method between a thigh frame and a thigh fixation belt with a clamp.
Figure 14:
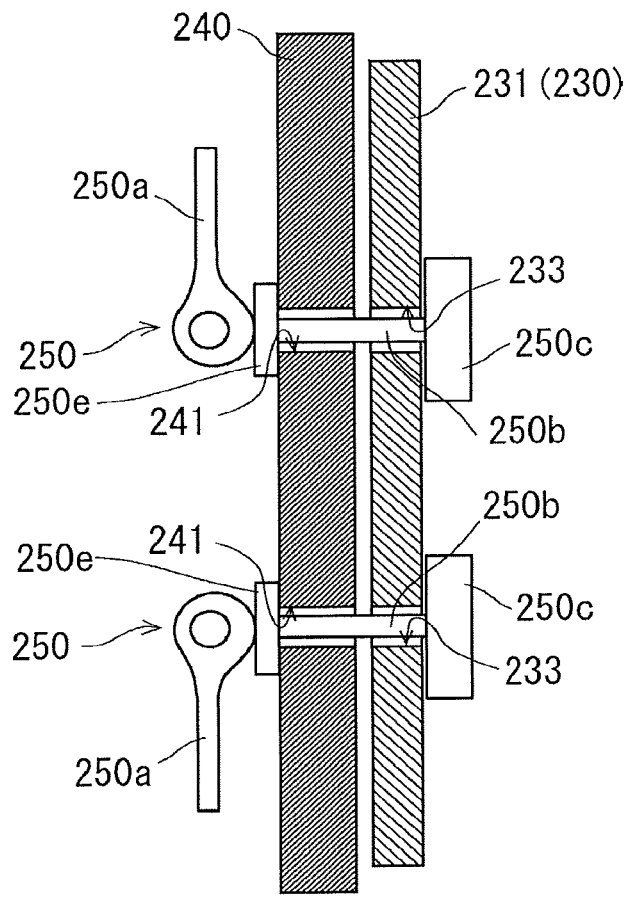
FIG. 14 is a schematic view to describe the connection method between the thigh frame and the thigh fixation belt with the clamp.

Here, the following describes a connection method between the thigh frame 240 and the thigh fixation belt 230 with the clamp 250. FIGS. 13 and 14 are schematic views to describe the connection method between the thigh frame 240 and the first wing 231 with the clamp 250. Note that FIGS. 13 and 14 correspond to a section along a XIII-XIII line of FIG. 11. As illustrated in FIG. 13, the adjustment elongated hole 241 of the thigh frame 240 is aligned with the insertion hole 233 of the first wing 231 at the same position in the up-down direction (the Z-axis direction), and the head 250c of the clamp 250 is inserted.

In a state where the head 250c of the clamp 250 is inserted into the adjustment elongated hole 241 of the thigh frame 240 and the insertion hole 233 of the first wing 231, the first wing 231 is moved in the right-left direction (the Y-axis direction), so that a position of the first wing 231 in the right-left direction (the Y-axis direction) relative to the thigh frame 240 can be adjusted.

After the position of the first wing 231 in the right-left direction (the Y-axis direction) relative to the thigh frame 240 is determined, the clamp 250 is rotated by 90° around the shaft portion 250b, and the lever 250a is put down to narrow the distance between the head 250c and the movable board 250e, as illustrated in FIG. 14. Hereby, the first wing 231 is fixed to the thigh frame 140.

A connection method between the thigh frame 240 (see FIG. 11) and the second wing 232 (see FIG. 10) with the clamp 250 (see FIG. 12) is the same as the aforementioned connection method between the thigh frame 240 and the first wing 231. That is, the adjustment elongated hole 241 of the thigh frame 240 as illustrated in FIG. 11 is aligned with the insertion hole 234 of the second wing 232 as illustrated in FIG. 10 at the same position in the up-down direction (the Z-axis direction), and the head 250c of the clamp 250 as illustrated in FIG. 12 is inserted. Then, the second wing 232 is moved in the right-left direction (the Y-axis direction), so that a position of the second wing 232 in the right-left direction (the Y-axis direction) relative to the thigh frame 240 is adjusted, and the second wing 232 is fixed to the thigh frame 140 with the clamp 250.

Note that the connection portion that connects the thigh fixation belt 230 to the thigh frame 240 may be configured such that respective adjustment elongated holes as connection adjustment mechanisms are formed in the first wing 231 and the second wing 232 in the thigh fixation belt 230, and an insertion hole through which the head 250c of the clamp 250 can pass is formed in the thigh frame 240.

[Third Modification]

Figure 15:
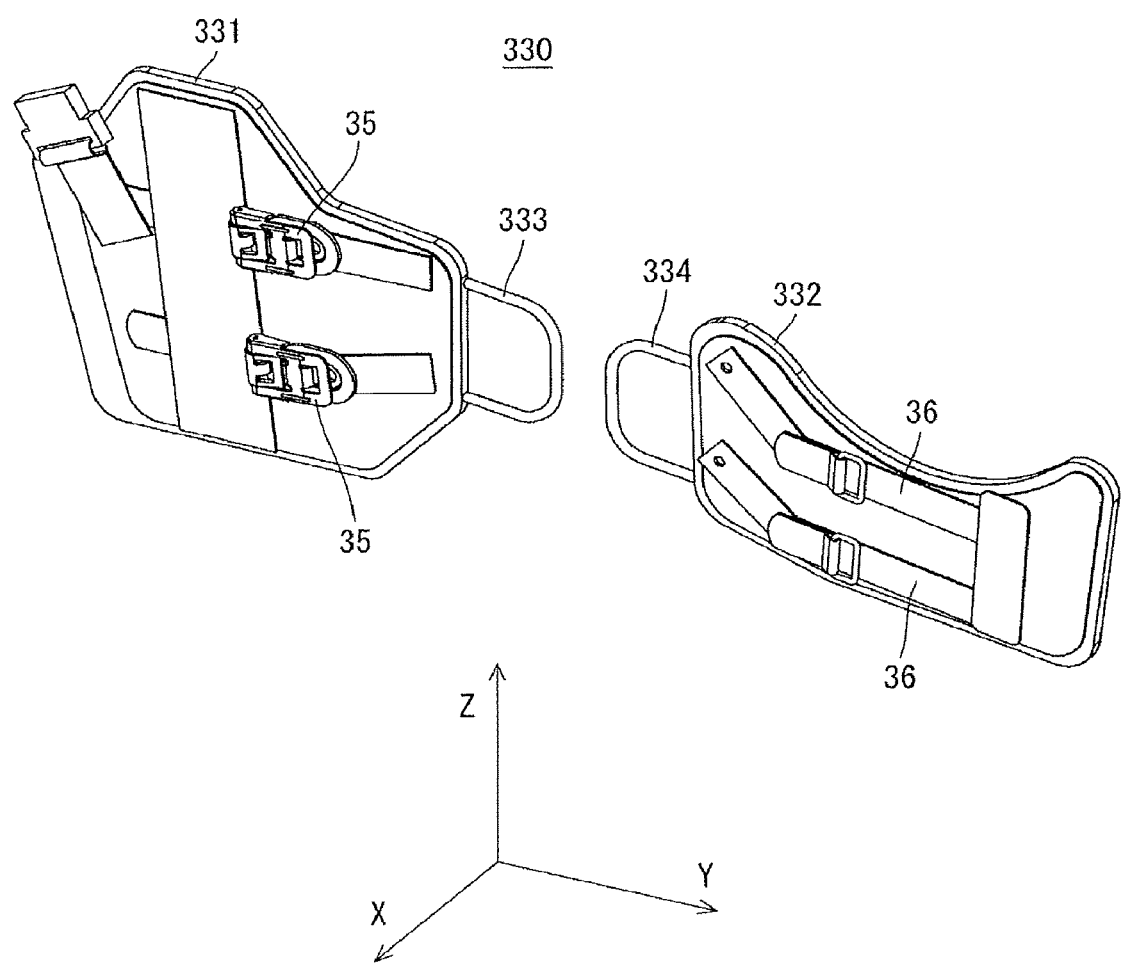
FIG. 15 is a perspective view illustrating a configuration of a thigh fixation belt in the Third Modification.

FIG. 15 is a perspective view illustrating a configuration of a thigh fixation belt 330 in the Third Modification. As illustrated in FIG. 15, the thigh fixation belt 330 is constituted by a first wing 331 and a second wing 332. Similarly to the first wing 31 illustrated in FIG. 2, the first wing 331 includes stoppers 35. A wire 333 is attached to an end of the first wing 331 in an arch shape. Similarly to the second wing 32 illustrated in FIG. 2, the second wing 332 includes bands 36. A wire 334 is attached to an end of the second wing 332 in an arch shape. The wire 333 and the wire 334 constitute a part of a connection portion that connects the thigh fixation belt 330 to a thigh frame 340.

Figure 16:
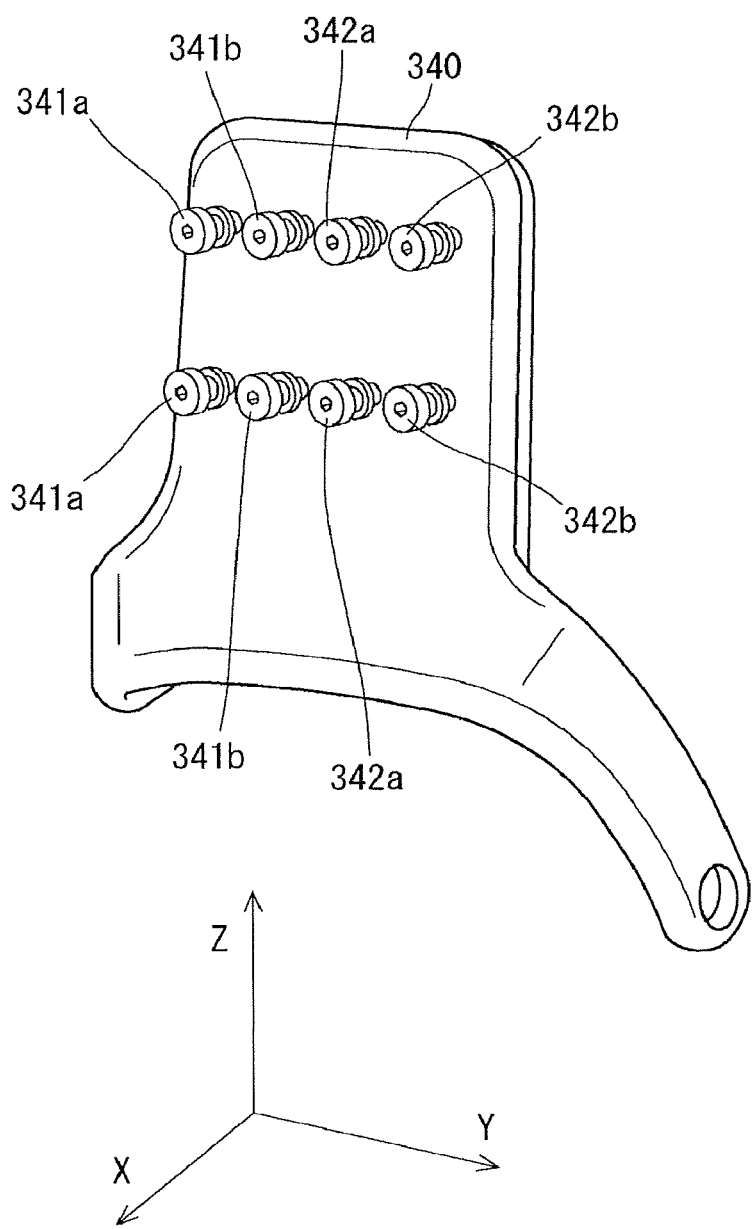
FIG. 16 is a perspective view illustrating a configuration around a connection portion of a thigh frame with the thigh fixation belt in the Third Modification.

FIG. 16 is a perspective view illustrating a configuration around the connection portion of the thigh frame 340 with the thigh fixation belt 330 in the Third Modification. Note that a basic configuration of the thigh frame 340 is the same as the thigh frame 40 illustrated in FIG. 1. The thigh frame 340 is different from the thigh frame 40 in a configuration of the connection portion. As illustrated in FIG. 16, the thigh frame 340 includes hooks 341a, 341b, 342a, 342b formed as connecting position adjustment mechanisms in the connection portion that connects the thigh fixation belt 330 to the thigh frame 340. Respective positions where the hooks 341a, 341b, 342a, 342b are formed in the thigh frame 340 correspond to the positions where the connecting holes 41a, 41b, 42a, 42b are provided in the thigh frame 40 illustrated in FIG. 3. That is, the hook 341a and the hook 341b are formed side by side along the right-left direction, and the hook 342a and the hook 342b are formed side by side along the right-left direction.

The hooks 341a, 341b, 342a, 342b can be formed into any shape, provided that the wire 333 of the first wing 331 and the wire 334 of the second wing 332 can be hooked thereto. For example, as illustrated in FIG. 16, the hook 341a, 341b, 342a, 342b may include a cylindrical head and a cylindrical support portion having a diameter smaller than the head.

Note the hooks 341a, 341b, 342a, 342b are provided at two places in the up-down direction (the Z-axis direction), but are not limited to this. They may be provided at two or more places in the up-down direction (the Z-axis direction). Further, instead of the configuration in which the hooks 341a, 341b, 342a, 342b are provided at two places in the up-down direction (the Z-axis direction), the hook 341a, 341b, 342a, 342b may be provided only at one place. In the thigh frame 340, the hooks (the hooks 341a, 341b) provided to correspond to the wire 333 of the first wing 331 are formed side by side at two places along the right-left direction, but are not limited to this. In the thigh frame 340, the hooks provided to correspond to the wire 333 of the first wing 331 may be formed side by side at two or more places along the right-left direction. In the thigh frame 340, the hooks (the hooks 342a, 342b) provided to correspond to the wire 334 of the second wing 332 are formed side by side at two places along the right-left direction, but the present embodiment is not limited to this. In the thigh frame 340, the hooks provided to correspond to the wire 334 of the second wing 332 may be formed side by side at two or more places along the right-left direction.

Figure 17:
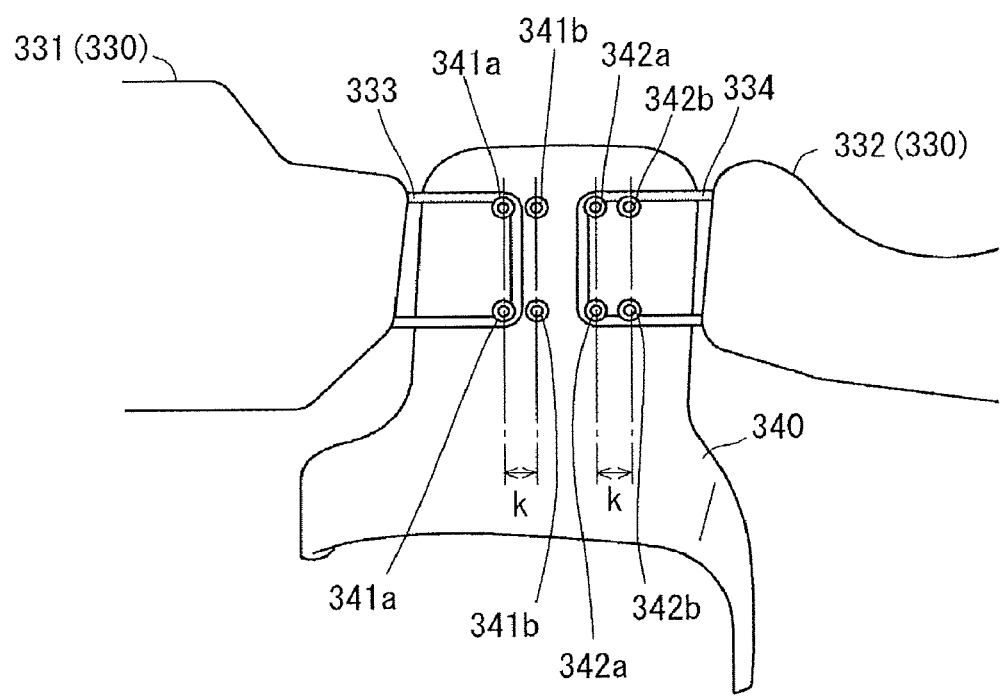
FIG. 17 is a schematic view illustrating a connecting state of the thigh frame with a first wing and a second wing of the Third Modification in a case where the thigh frame of the Third Modification is attached to an affected leg of a trainee with a large build.

FIG. 17 is a schematic view illustrating a connecting state of the thigh frame 340 with the first wing 331 and the second wing 332 in a case where the thigh frame 340 is attached to an affected leg of a trainee with a large build. Here, it is assumed that the affected leg of the trainee is a right leg. As illustrated in FIG. 17, the wire 333 of the first wing 331 is hooked to the hooks 341a of the thigh frame 340, so that the thigh frame 340 is connected to the first wing 331. Similarly, the wire 334 of the second wing 332 is hooked to the hooks 342a of the thigh frame 340, so that the thigh frame 340 is connected to the second wing 332.

In the meantime, in a case where the thigh frame 340 is attached to an affected leg of a trainee with a small build, the wire 333 of the first wing 331 is hooked to the hooks 341b of the thigh frame 340, so that the thigh frame 340 is connected to the first wing 331, and the wire 334 of the second wing 332 is hooked to the hooks 342b of the thigh frame 340, so that the thigh frame 340 is connected to the second wing 332. That is, as compared to the case where the thigh frame 340 is attached to the affected leg of the trainee with a large build, a connecting position between the thigh frame 340 and the first wing 331 and a connecting position between the thigh frame 340 and the second wing 332 can be moved only by k toward a leg (left leg) opposite to the affected leg, that is, the Y-axis positive direction.

Thus, with the above embodiment, it is possible to restrain the thigh frame from interfering with a leg opposite to a leg wearing the walking assistant harness, regardless of a build of a trainee.

Note that the present disclosure is not limited to the above embodiment, and various modifications can be made within a range that does not deviate from the gist of the present disclosure. For example, in the above embodiment, the thigh fixation belt is configured such that the first wing and the second wing are separated, but they may be formed integrally.

What is claimed is:

1. A walking assistant harness attached to a leg of a trainee so as to assist walking of the trainee, the walking assistant harness comprising:
a thigh frame placed along a front side or a rear side of a thigh of the trainee; and
a thigh fixation belt including a first wing and a second wing,
wherein the first wing is connected to a first portion of the thigh frame at a first connection portion and the second wing is connected to a second portion of the thigh frame at a second connection portion so as to fix the thigh of the trainee to the thigh frame,
wherein the first connection portion includes a first connecting position adjustment mechanism configured to adjust a first connecting position with the thigh fixation belt in a right-left direction of the trainee, and the second connection portion includes a second connecting position adjustment mechanism configured to adjust a second connecting position with the thigh fixation belt in the right-left direction of the trainee, wherein the first connecting position and the second connecting position are adjustable based on a size of the thigh of the trainee, wherein each of the first connecting position adjustment mechanism and the second connecting position adjustment mechanism is constituted by a plurality of connecting holes provided in the thigh frame side by side along the right-left direction of the trainee, and wherein the first wing includes a first protruding portion to be engaged with any of the plurality of connecting holes of the first connecting position adjustment mechanism, and the second wing includes a second protruding portion to be engaged with any of the plurality of connecting holes of the second connecting position adjustment mechanism, wherein the first protruding portion and the second protruding portion each includes a cylindrical head and a cylindrical support portion having a diameter smaller than that of the cylindrical head, a first end of the cylindrical support portion being fixed to the first wine or the second wing, and the cylindrical head being provided at a second end of the cylindrical support portion, and wherein each of the plurality of connecting holes includes an attachment hole to which the first protruding portion or the second protruding portion is fixed, an insertion hole having a diameter larger than that of the attachment hole, and a communication passage via which the attachment hole communicates with the insertion hole.

2. The walking assistant harness according to claim 1, further comprising:
   a lower leg frame rotatably connected to the thigh frame via a knee joint portion and placed along a lower leg of the trainee; and
   a sole frame connected to the lower leg frame and attached to a foot of the trainee.

3. The walking assistant harness according to claim 1, wherein the first wing includes stoppers and the second wing includes bands.

4. The walking assistant harness according to claim 1, wherein the attachment hole and the insertion hole are offset from each other in the right-left direction and in an up-down direction.

\* \* \* \* \*